(No Model.) 2 Sheets—Sheet 1.
R. A. GRANT.
HAY PRESS.
No. 452,604. Patented May 19, 1891.
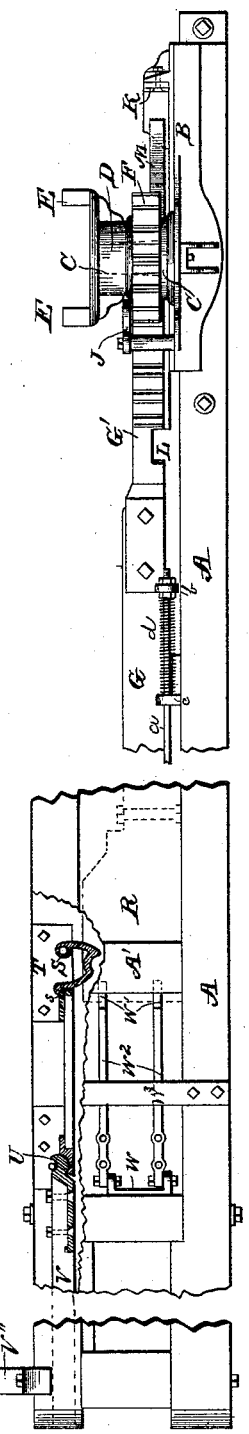
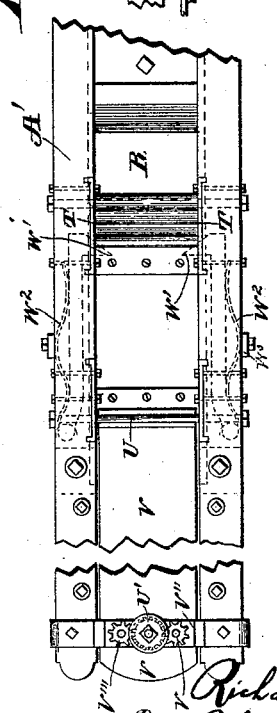
WITNESSES:
Percy C. Bowen
Robt. Aiton
INVENTOR
Richard A. Grant
By Robt. Aiton & Co.
Attorneys.
THE NORRIS PETERS CO., PHOTO-LITHO., WASHINGTON, D. C.

(No Model.) 2 Sheets—Sheet 2.

R. A. GRANT.
HAY PRESS.

No. 452,604. Patented May 19, 1891.

WITNESSES:
Percy C. Bowen
Robt Aiton

INVENTOR
Richard A Grant
By Robt Aiton & Co.
Attorney

UNITED STATES PATENT OFFICE.

RICHARD A. GRANT, OF HOUSTON, TEXAS.

HAY-PRESS.

SPECIFICATION forming part of Letters Patent No. 452,604, dated May 19, 1891.

Application filed January 31, 1889. Serial No. 298,246. (No model.)

*To all whom it may concern:*

Be it known that I, RICHARD A. GRANT, a citizen of the United States, residing at Houston, in the county of Harris and State of Texas, have invented a new and useful Hay-Press, of which the following is a specification.

My invention relates to improvements in hay-presses; and it consists in the combination of parts herein described and claimed, and shown in the accompanying drawings, in which—

Figure 4:
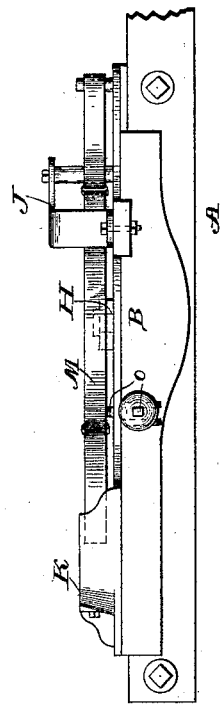
Figure 6:
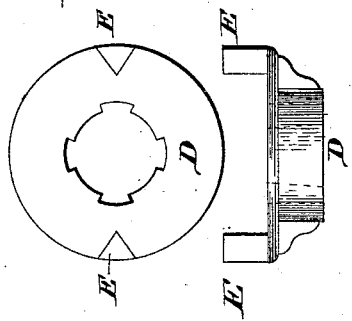
Figure 5:
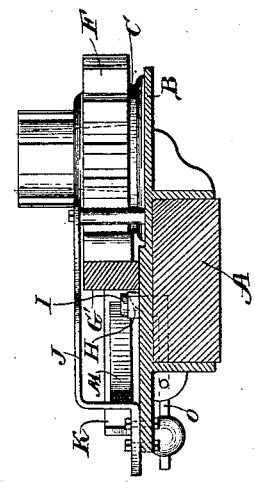
Figure 5:
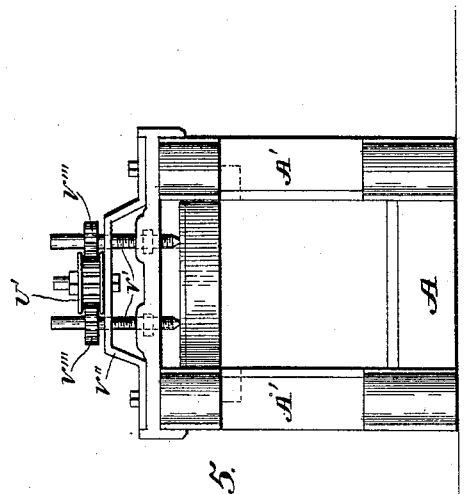

Figure 1 represents a side view of a hay-press having my improvements. Fig. 2 represents a plan view of the hay-press shown in Fig. 1. Fig. 3 represents a vertical section on line $x$ $x$, Fig. 2. Figs. 4, 5, and 6 represent detail views of portions of the machine.

Similar letters refer to like parts in the various figures.

A represents the bottom or foundation timbers, on which is erected the frame A' of the machine, and to which is securely bolted the bed-plate B. The pin or stud C is fastened to the bed-plate B by bolts or screws passing through openings in its head, so that it is held firmly in place, serving as a journal for the lever-plate D, and tooth-wheel F, mounted thereon. The said plate D is provided with two or more upwardly-projecting lugs E E, and is secured in any suitable manner to the wheel F, so as to be rotated therewith. Securely fastened to one end of the connecting-rod G is a rack G', the teeth of which are adapted to be engaged by the teeth of the wheel F, so as to have reciprocating motion.

H represents a button of preferably rectangular form and mounted on a pin I, which is located on the bed B opposite the wheel F, the said button serving to keep the rack in contact with the wheel during the inner stroke of the rack and its connecting-rod. A bar J is secured to the bed B above the rack G', so as to keep the same in place on the bed. A buffer K is secured to the bed B, so as to be in contact with the outer end of the rack G' at the end of its return or outer stroke. Secured at one end to the bed-plate B and passing under the bar J is the spring M, adapted to force the rack G' into engagement with the wheel F.

O represents a lever pivotally mounted on the bed-plate and having a rounded upper face or projection, as shown, so as readily to permit the rack to be forced into position by the spring M for the inner stroke.

R represents the ram secured to the connecting-rod G and working between the sides of the frame A'.

The folder S, of irregular curved shape, is pivoted at one end to the plates T T, which are secured to the inner sides of the frame A', and has a lip $s$ at its front end which rests on a cross-bar of the frame A'. The plank V, which serves as a cover to the receptacle receiving the hay to be pressed, is secured to the frame by the hinge U, so that the raising and lowering of said plank may be regulated by means of the screw V' and toothed wheel U'. The screws V' are mounted in the bracket V'' and have the cog-wheels V''' secured thereon, so as to rotate therewith. The wheel U' is mounted on a stud secured to the upper portion of the bracket V'' and rotates by the same, thus operating the screws V', the lower ends of which bear against the upper faces of the plank V. Pivotally secured to bracket W on the sides of the frame A' are hooks W', having the springs W² bearing against the same. The points of the hooks W' extend inside of the frame. When the partition-block is dropped into the frame and forced past the hooks, the pressure forces the hooks against the springs W², pressing the latter against the bar W³, attached to the side of the frame. When the partition-block has passed the hooks, the tension on the spring is then relaxed, the recoil drawing the hooks quickly in rear of the partition-blocks and then holding it ready to form the next bale. As will be noticed in the drawings, the springs are riveted to the hooks at one end. This I prefer, as secured in this way they have the advantage of being less liable to break or get out of line.

The operation of the machine is as follows: The lever-plate D and cog-wheel F are rotated by means of a lever-handle, which engages the lugs E, and the rack G' is moved inward, so that the connecting-rod G and ram R are operated. When the rack is near the end of its inner stroke and its end has passed the stud or pin I, so that it bears against one end of the button H, it is released from the toothed wheel F and springs toward the opposite side of the bed-plate B. At the same time, owing to the recoil of the ram, the rack passes along the other side of the button, over the lever O, and against the spring M and buffer K. By this time the recessed portion L on the under side and at the inner end of the rack is opposite the button H, so that the spring M forces the rack G' into engagement with the wheel F, the rounded portion of the inner end of the lever O permitting the rack to readily yield to the pressure of the said spring, and when raised, owing to the weighted outer end, serving to keep the rack in place against the wheel, the rack being again in position for another stroke. Owing to the shape of the folder S the hay is readily permitted to enter the frame A', but is prevented from returning, the folder being stopped from swinging downward owing to the lip s and the cross-bar on which it rests. Owing to the hinged support of the plank V and its adjustment by the screws, as shown, the strain is less directly upon the frame of the press, and also, if the hay by reason of moisture should become expanded, the lid can readily be removed and the hay be forced out. To aid in the recoil of the ram, the device shown in Figs. 1 and 2 may be employed, said device consisting of a rod a, adjustably secured at one end to a projection or attachment b on the side of the rod G of the ram and having its outer end adapted to work in an eye c, secured to the frame A, a coil-spring d being between the projection on the ram and the eye on the frame. The spring is compressed during the ramming of the bale, but on the release of the rack from the wheel it exerts its force in connection with the recoil, so that the handle of the ram is reliably forced back to the buffer K.

The machine as thus constructed is simple and durable in character and effective in operation.

What I desire to secure by Letters Patent is—

1. In a press, the combination of a ram having a rod with a rack on its side, a pinion journaled on one side of said rod and adapted to mesh with said rack, and a pivoted rectangular button adapted to keep said rack at times in engagement with the pinion, substantially as described.

2. In a hay-press, the combination of a ram having a rod with a rack on its side and a recess in its under side, a pinion meshing with said rack, a pivoted button for holding the rack and pinion in engagement, a buffer for the rod, and a spring for returning the rod over the button and into contact with the pinion, substantially as described.

3. In a hay-press, the combination of a ram with a rack on one side and a recess on its under side, a pinion meshing with said rack, a rectangular pivoted button adapted to hold said rack and pinion in engagement, a spring for forcing said rod over said button and into contact with the pinion, and a weighted lever with a rounded upper end, substantially as and for the purpose set forth.

4. The combination of the ram R, having the connecting-rod G and rack G', the latter having the recessed portion L, the bed-plate B, the rotatable cog-wheel engaging said rack, the button H, the spring M, secured at one end to the bed-plate and adapted to bear against the rack G', the weighted lever O, having rounded upper inner end, and the buffer K, said parts being combined substantially as described.

RICHARD A. GRANT.

Witnesses:
JAMES CHARLTON,
THEODORE E. MILLER.